United States Patent [19]

Atkielski

[11] 4,304,363
[45] Dec. 8, 1981

[54] TOBACCO GRINDER

[76] Inventor: John X. Atkielski, 3542 N. Albany, Chicago, Ill. 60618

[21] Appl. No.: 88,408

[22] Filed: Oct. 26, 1979

[51] Int. Cl.$^3$ .................. B02C 19/00; A47J 42/34
[52] U.S. Cl. ............................................ 241/169.1
[58] Field of Search ............... 241/168, 169, 169.1, 241/169.2, 278 A, DIG. 27

[56] References Cited

U.S. PATENT DOCUMENTS

| | | | |
|---|---|---|---|
| 210,837 | 12/1878 | Chalas | 241/169.1 |
| 1,251,160 | 12/1917 | Woody | 241/169.1 X |
| 3,136,491 | 6/1964 | Posmanter | 241/169.1 |
| 4,026,490 | 5/1977 | Johansson | 241/169.1 |
| 4,135,672 | 1/1979 | Schlessel | 241/169.1 |
| 4,139,161 | 2/1979 | Hupperich | 241/169.1 X |

*Primary Examiner*—Howard N. Goldberg
*Attorney, Agent, or Firm*—Fitch, Even, Tabin, Flannery & Welsh

[57] ABSTRACT

A compact grinder for material used for cigarettes. The grinder comprises a housing having upper and lower halves which are arranged to rotate relative to each other, a sieve positioned horizontally in the end of a half of the housing, and grinding means positioned within the housing and arranged to grind tobacco therein upon the rotation of the halves of the housing relative to each other, whereby the ground foreign particle free material is passed out through the sieve and collected in a cap. The cap is adapted to collect a desired amount of material such that said material may be applied directly from the cap to a rolling paper used for cigarettes.

3 Claims, 9 Drawing Figures

U.S. Patent Dec. 8, 1981 Sheet 1 of 2 4,304,363
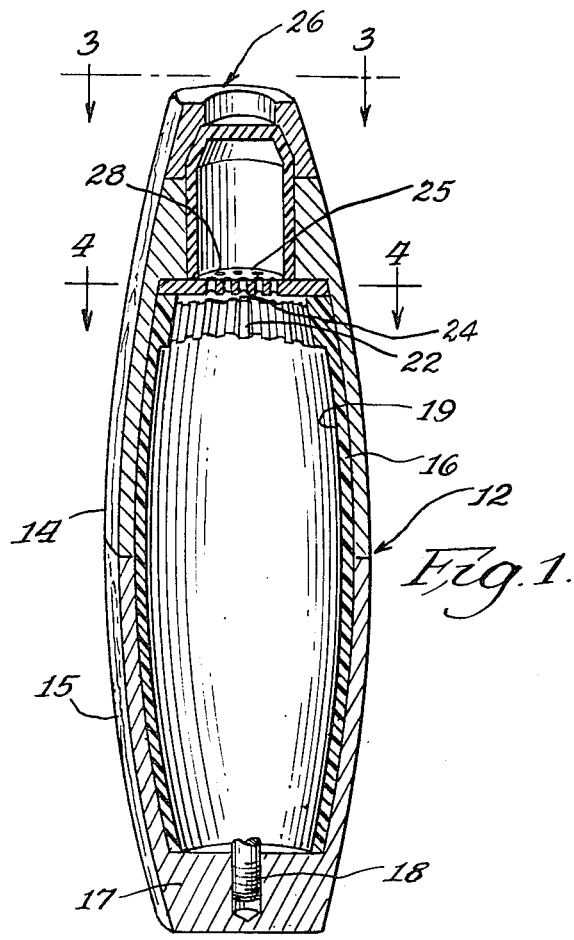
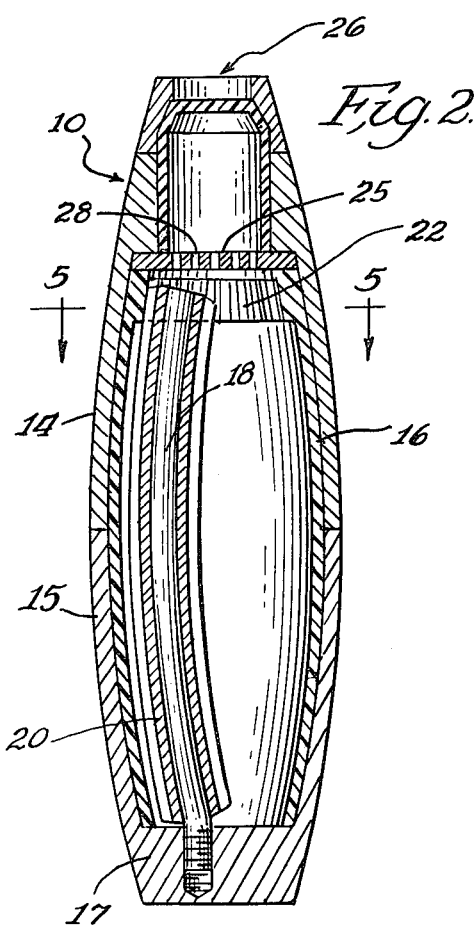
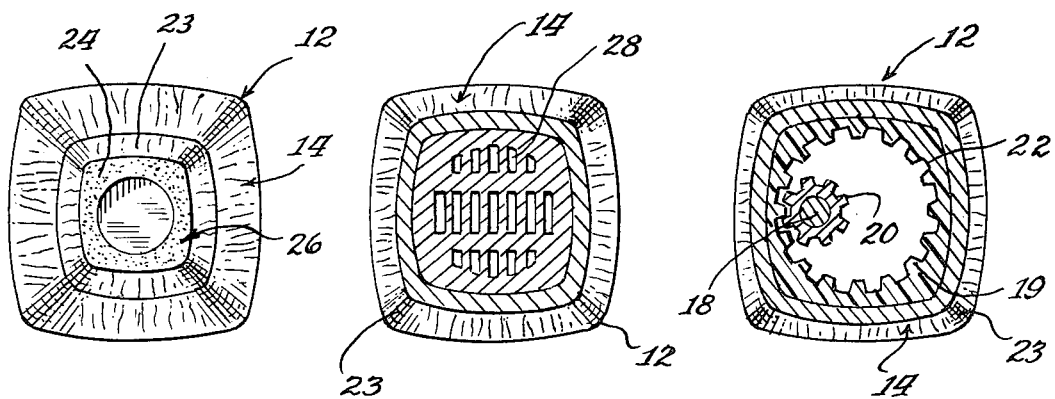

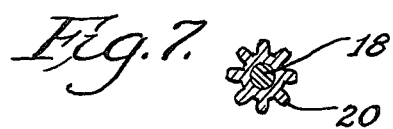
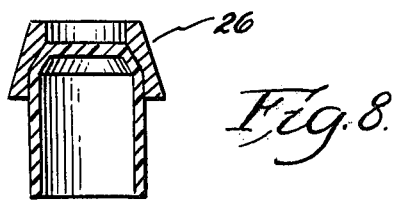
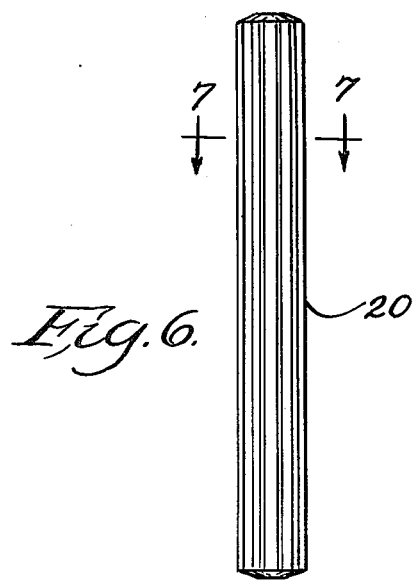
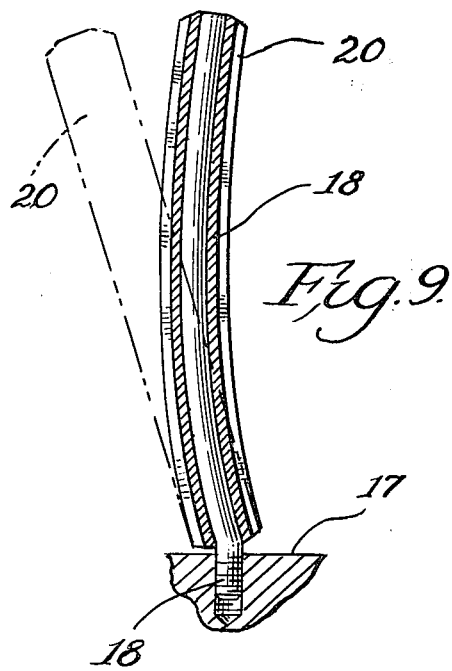

TOBACCO GRINDER

BACKGROUND OF THE INVENTION

This invention relates to grinders, and more particularly to grinders useful for material used in cigarettes.

There are several different types of grinders which have been used for grinding material used in cigarettes. There are large and small grinders which may be powered or manually operated. Generally, these grinders are used by commercial organizations and are either too cumbersome or expensive for personal and home use.

Accordingly, there is a need for a small, compact grinder useful for material used in cigarettes which is able to be carried in a woman's purse, automobile glove compartment and the like, and which is easily operated to provide freshly ground foreign particle free material for rolling cigarettes. The present invention, as described below, provides such a simply operated and inexpensive grinder.

Further, the present invention provides both a method of grinding and cleaning the smoking material and applying the smoking material to a rolling paper.

In addition the present invention provides a method of applying only clean smoking material to the rolling paper while excluding the twigs and seeds which may be contained with the leaves on other smoking material.

SUMMARY OF THE INVENTION

The present invention provides a grinder for material used in cigarettes which is compact and easily operated to provide freshly ground and foreign particle free material. The grinder comprises:
  (a) a housing having an upper half and a lower half which are arranged to rotate relative to each other;
  (b) a sieve positioned horizontally in a half of the housing;
  (c) grinding means positioned within the housing and arranged to grind tobacco therein upon the rotating of the halves of the housing relative to each other, whereby the ground material is passed out through the sieve and collected in a cap; and
  (d) the cap being adapted to collect a desired amount of smoking material such that the smoking material may be applied directly from the cap to rolling paper used for cigarettes.

Additionally this invention provides a grinder for material used in cigarettes which preferably used predried material and these drying agents are not required. Further, the use of predried material in combination with the sieve allows only ground clean smoking material in the cap.

BRIEF DESCRIPTION OF DRAWINGS

Other objects and advantages of the present invention will be apparent from the following discussion when considered in conjunction with the accompanying drawing, which is for the purpose of illustrating only and in which:

FIG. 1 is a perspective sectional view of an embodiment of the present grinder for material used in cigarettes.

FIG. 2 is a cross-sectional view taken showing the interior of the grinder;

FIG. 3 is a top plan view of the grinder of FIG. 1;

FIG. 4 is a cross-sectional view of the grinder, taken along line 4—4 of FIG. 1;

FIG. 5 is a cross-sectional view of the grinder, taken along line 5—5 of FIG. 2;

FIG. 6 is a perspective view of the grinding shaft of the grinder of FIG. 1;

FIG. 7 is a cross-sectional view of the grinding shaft, taken along line 7—7 of FIG. 6;

FIG. 8 is a perspective view of the cap and sieve of the grinder of FIG. 1;

FIG. 9 is a perspective view of the grinding shaft of FIG. 6 during operation.

DETAILED DESCRIPTION OF PREFERRED EMBODIMENTS

The grinder for material used in cigarettes described below is compact, simply operated and particularly useful for grinding and cleaning tobacco for cigarettes.

Referring to FIGS. 1 and 2, one embodiment of the present grinder of material used in cigarettes is illustrated. As shown, the grinder 10 has a housing 12 which consists of an upper half 14 and a lower half 15, and an inner plastic sleeve 16 secured within the upper half 14. The sleeve 16 is arranged and has an outside diameter to fit snugly within the lower half 15. Accordingly, the halves 14 and 15 are arranged to rotate relative to each other.

In the base 17 of the lower half 15, a threaded rod 18 is secured and extends vertically upward within the housing 12. A ratchet-shaped shaft 20 (FIGS. 8 and 9) is placed on the rod on which it revolves around the interior of the housing 12 when the halves 14 and 15 are rotated relative to each other.

As indicated in FIGS. 1 and 2 and shown in FIG. 5, gear-like grooves 22 are formed in a circle on the interior wall 19 of the upper half 14 of the housing 12. The vertical grooves 22 may be of any length to coordinate with the shaft 20. Grooves of about ⅛ inch long have been found to be satisfactory.

The wall 23, as shown in FIGS. 3–5, of the housing 12 is preferably made of wood or molded plastic. However, any suitable material, e.g. cork, may be used.

Also as illustrated in FIGS. 1 and 2 and also shown partially in FIG. 8, the upper half 14 of the housing 12 has an opening 24 in which a sieve 25 is horizontally positioned, and into which a hollow cap 26 is placed during both the used and non-use of the grinder to receive and hold the clean ground material for use in rolling cigarettes. Specifically, when the material is ground, a shaking movement is used to collect and hold the ground material in cap 26. When a desired amount is collected in cap 26, the cap 26 with the clean ground material is pulled out of grinder 10, and is used as an applicator in applying the clean ground material to a rolling paper. Due to the different materials which can be ground and used for smoking, the sieve 25, may be made with holes 28 of different sizes and shapes.

In FIG. 9, the movement of the grinding shaft 20 is illustrated in the operation of the grinder 10. In the operation, as the upper half 14 of housing 12 is rotated relative to the lower half 15, the ratchet-shaped shaft 20 engages with its top portion, the gear-like grooves 22 formed in a circle on the inner wall 19 of the upper half 14. This movement of the grinding shaft 20 grinds the tobacco placed within the housing 12. After the tobacco is ground, it is passed out through the holes or spaces 28 of the sieve 25 for cleaning into the hollow cap 26 where it is held to be used in the applying clean ground material for a cigarette.

While the presently preferred embodiments of the invention have been described in considerable specific structural detail, it will be understood that the invention is susceptible to various changes and modifications within the purview of one skilled in the art. Those skilled in the art will realize that in addition to grinding smoking material, e.g. tobacco, other material such as tea leaves, nuts, etc., can be ground with this device. Further, it is preferred that predried material be used with this grinder. However, where moist material is to be used with this grinder, the housing 12 may be of a moisture absorbent material, e.g. cork. In addition, it should be realized that threaded or non-threaded rods as well as no rods at all may be used in association with the mechanism used in the grinder.

I claim:

1. A grinder for material used for cigarettes comprising:
   a housing having an upper half and a lower half which are arranged to rotate relative to each other;
   a sieve positioned horizontally in a half of said housing; and
   grinding means positioned within said housing and arranged to grind tobacco therein upon the rotating of halves of said housing relative to each other, whereby the ground tobacco is passed out through said sieve,
   said grinding means having a ratchet-shaped shaft positioned vertically within said housing and arranged to coordinate with gear-like grooves formed on the inner wall of said housing, whereby when the halves of said housing are rotated relative to each other the shaft revolves around the inside of said housing to grind tobacco placed therein.

2. A grinder according to claim 1, wherein said sieve is positioned adjacent a hollow cap for receiving, holding, and applying ground material.

3. A grinder according to claim 2, wherein said cap is removable and useful to apply ground material directly to a rolling paper.

* * * * *